United States Patent
Sparks et al.

(10) Patent No.: US 7,603,108 B2
(45) Date of Patent: Oct. 13, 2009

(54) AUTOMATIC CONNECTION AND ACCESS CONTROLS FOR COMMUNICATIONS DEVICES

(75) Inventors: J. Steven Sparks, Atlanta, GA (US); Jeremy Paben, Kansas City, MO (US)

(73) Assignee: Accenture Global Services GmbH, Schaffhausen (CH)

( * ) Notice: Subject to any disclaimer, the term of this patent is extended or adjusted under 35 U.S.C. 154(b) by 0 days.

(21) Appl. No.: 11/019,289

(22) Filed: Dec. 23, 2004

(65) Prior Publication Data
US 2005/0288002 A1 Dec. 29, 2005

(51) Int. Cl.
*H04M 3/42* (2006.01)

(52) U.S. Cl. ............... 455/414.1; 455/406; 455/415; 379/209.1; 379/266.07; 370/352; 709/204; 709/206

(58) Field of Classification Search ............... 455/414.1, 455/406, 415; 379/209.1, 266.07; 370/352
See application file for complete search history.

(56) References Cited

U.S. PATENT DOCUMENTS

| | | | |
|---|---|---|---|
| 6,687,359 B1 * | 2/2004 | D'Arcy et al. ............ 379/209.1 |
| 6,957,107 B2 * | 10/2005 | Rogers et al. ............... 607/60 |
| 7,023,980 B2 * | 4/2006 | Lenard ................ 379/266.07 |
| 2002/0024947 A1 * | 2/2002 | Luzzatti et al. ............ 370/352 |
| 2002/0196280 A1 * | 12/2002 | Bassett et al. .............. 345/751 |
| 2003/0046296 A1 * | 3/2003 | Doss et al. ................ 707/102 |
| 2003/0135569 A1 * | 7/2003 | Khakoo et al. ............ 709/206 |
| 2004/0003042 A1 * | 1/2004 | Horvitz et al. ............ 709/204 |
| 2005/0041793 A1 * | 2/2005 | Fulton et al. ........... 379/211.01 |
| 2007/0106631 A1 * | 5/2007 | Wobbe ......................... 707/1 |

* cited by examiner

*Primary Examiner*—Lester Kincaid
*Assistant Examiner*—Charles Shedrick
(74) *Attorney, Agent, or Firm*—Finnegan, Henderson, Farabow, Garrett & Dunner, LLP

(57) ABSTRACT

The invention provides a call system and methods whereby users can establish a predetermined list of contacts and whereby those contacts can be reached by the touch of a single button on a communications device. The system in accordance with the invention will also determine whether the designated contacts are available and directly connect the user to an available contact. The invention also allows users to establish a set of access rules governing when and who may be contacted using the communications device.

12 Claims, 9 Drawing Sheets

AUTOMATIC CONNECTION AND ACCESS CONTROLS FOR COMMUNICATIONS DEVICES

BACKGROUND OF INVENTION

1. Field of Invention

The invention relates generally to communications systems and methods. More particularly, the invention relates to systems and methods for initiating calls in a communications network to available members of a prioritized list of contacts and for establishing call access control rules within the communications network.

2. Discussion of the Related Art

Conventional communications systems include a variety of users having both wireless and landline communications devices which can communicate with each other across both wireless and landline communications networks. Users typically contact one another by dialing a telephone number assigned to each user. This process can be made simpler though a "speed dial" feature which allows users to program their respective user devices with a certain number of predetermined telephone numbers. Keys on the user device are then assigned a corresponding telephone number which can then be dialed by pressing that pre-assigned key. For example the "1" key can be programmed to automatically dial the user's home telephone number. Alternatively, the user device may provide an interface which displays the preprogrammed speed dial numbers which can be viewed and selected by the user.

The speed dial feature, while useful, still requires the user to remember which keys are assigned to certain telephone numbers. In addition, each user device may only be capable of holding a limited number of preprogrammed numbers. In addition, when a user initiates a call using the speed dial feature, there is no guarantee that the user will make contact with the intended recipient of the call. Instead, the user may reach a busy signal, voicemail or some other indication that the intended call recipient is unavailable. Thus, the speed dial feature is not conducive to those situations, such as emergency situations, when a user may not have time to remember how the speed dial keys are assigned or is not in a position to try to call several contacts until an available contact answers the telephone.

Conventional communications devices, in certain cases, also provide users with the ability to view the source of an incoming call. This "caller identification" function may be configured so that the user can view the telephone number of the incoming call or, in some cases, the incoming call may be matched against preprogrammed telephone numbers, so that the name of the incoming caller is displayed (e.g., "incoming call from Steve"). While the caller identification function allows users to know the source of incoming calls, it does not allow users to control how those incoming calls are handled. Further, the caller identification function does not operate for outbound calls.

In many cases, however, it would be useful to not only be able to view caller information, but to also establish access control rules for the handling of both incoming and outbound calls. For example, parents may want the ability to control the time of day when their child's telephone is able to make calls (e.g., only from 8 a.m. to 8 p.m). In addition, users may want to block incoming calls from certain telephone numbers/sources and/or may want to disallow outbound calls to certain telephone numbers/destinations. In addition, users may want the ability to set and then change these access control rules easily.

Thus, it would be desirable to have a system and methods which allow a user to connect to predetermined contacts by depressing a single key on a user device and be assured that the call recipient is available. It would also be desirable to provide a system and methods which allow users to create a prioritized list of contacts that can be called in the order of their level of priority. It would further be desirable to provide a system and methods which allows users to establish access control rules governing incoming and outbound calls.

SUMMARY OF THE INVENTION

In view of the deficiencies of the conventional systems as described above, the invention provides a calling system and methods that allow users to contact available, predetermined contacts through a single button on a user device, establish a prioritized list of predetermined contacts and establish access control rules for communications devices. Thus, the invention allows users to initiate calls to predetermined contacts by depressing a single button on a communications device, prioritize those predetermined contacts based a user's selection, determine the availability of the contact selected by the user, cycle through the list of predetermined contacts and display contacts to the user in their order of priority and provide panic specific ring tones that identify emergency calls. The invention further provides a panic call functionality that allows users to initiate an emergency call to a predetermined emergency contact with the touch of a single button on the user device.

The system according to the invention also determines the availability of the predetermined contacts and then connects the user to only those contacts who are available (e.g., within a range of cellular service, able to answer the telephone, have their telephone on). This saves the user a significant amount of time by avoiding busy signals or reaching voice mail instead of a live voice. This is also significant in emergency situations where the user needs to reach a live person as soon as possible and may not be in a position to re-dial the telephone if the first person contacted is unavailable.

The invention further allows users to establish a predetermined contacts list and to assign each contact a priority level. Thus, certain contacts may be flagged with a higher priority than others so that the system in accordance with one embodiment of the invention will attempt to contact those persons designated with the highest priority first. In accordance with the invention, users can also provide additional information about each contact, such as their location information.

The invention also allows a user to attach various urgency levels to each call. Thus, for example, a user can indicate, using a user device, that the call is an emergency call or that the call has a medium or low urgency. In one embodiment, calls that are designated as emergency calls, such as when a user is panicked, may be automatically routed to "911" or other public emergency support services. The invention also allows a caller to interrupt an existing call in the event of an emergency. In another embodiment of the invention, if a user selects an urgency level, the system will retrieve only those contacts which have been designated to correspond to the selected urgency level. Thus, if a user indicates a low urgency level, according to this embodiment, the system will retrieve only those contacts identified as "low urgency level" contacts. In another embodiment of the invention, the urgency level selected by the user is conveyed to the user device of the call recipient. Thus, the call recipient will know the level of urgency of the call through any type of display or other visual, audio or text indication supportable by the user device.

In accordance with the invention, when a user depresses a call button located on the user device, the system in accordance with the invention retrieves a list of the contacts as created by the user. The system in accordance with the invention then determines the availability of the contacts, presents the user with at least one available contact and also initiates and completes the call to the available contact. Thus, the system according to the invention is able to cycle through the predetermined list of contacts until an available contact is located. As a result, through the touch of a single button on the user device, the user is placed into contact with an available contact. The system can also be configured so as to contact only those persons within a certain proximity of the user, or as described above, only those contacts who match a user selected urgency level.

In accordance with the invention, calls made to members of the predetermined contacts list may have a specialized ringtone. In addition, the system is not only able to open a voice connection between the caller and the call recipient, but may also allow for text messaging or voice to text communication. The system is also capable of sending a pre-recorded message to all available contacts rather than placing the user into voice communication with the available contact.

The invention also provides a system and methods that allow a user to configure access control rules. Thus, a user can program rules governing generation of outbound calls and the receipt of inbound calls. Among the rules, include the ability to control the time when calls can be made or received, as well as the ability to control who may be called or from whom calls can be received.

DETAILED DESCRIPTION OF THE PREFERRED EMBODIMENTS

Figure 1:
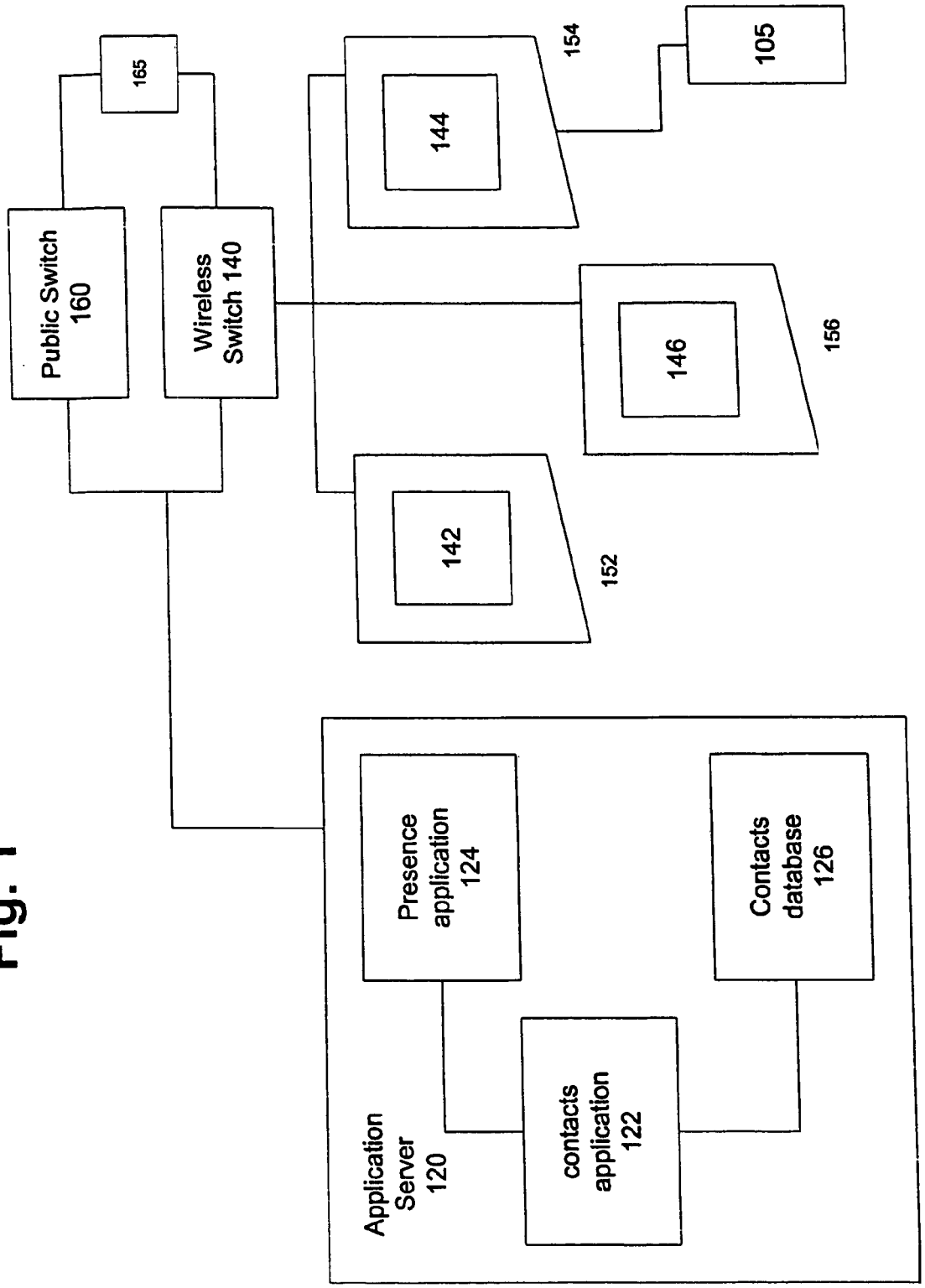
FIG. 1 is a block diagram of a system for managing calls to predetermined contacts in accordance with an embodiment of the invention.

FIG. 1 shows a system in accordance with an embodiment of the invention. In FIG. 1, a user device 105 is shown. The user device 105 may be any one of several known communications devices. In the embodiment of FIG. 1, the user device is a wireless communications device, such as a cellular phone or PDA equipped with wireless communications functionality. The user device 105 communicates with other devices via a communications network 110. Also, FIG. 1 shows an application server 120 in communication with the communications network 110. In FIG. 1, the communications network 110 may include communications hardware for both wireless and landline communications, including towers, switches, routers as well as any other hardware that facilitates wireless communications. Thus, as shown in FIG. 1, the communications network 110 may include a wireless switch 140 and a plurality of base stations 142, 144, and 146 connected to the wireless switch 140. The communications network 110 may be divided into a plurality of transmission regions or cells 152, 154, and 156. This type of wireless system is also known as a cellular system and each cell 152, 154 and 156 is served by a corresponding base station (e.g., base stations 142, 144 and 146).

A wireless user device, such as user device 105 will be served by one of the base stations 142, 144 and 146. The wireless switch 140 handles the switching of the calls among the base stations and other functions as will be described in detail.

The communications network 110 is capable of routing wireless and landline telephone calls. As an example, if a user initiates a call from a hard-wired telephone (not shown) to the wireless user device 105, the call travels from the hardwired telephone through a pair of telephone lines (not shown) to the public switch 160. The public switch 160 will then route the call to the wireless switch 140 via trunk 165 interconnecting the wireless and hardwired networks. Once the call is routed to the wireless switch 140, the wireless switch 140 first determines the cell where the dialed user device 105 resides, then routes the call to the base station serving that cell. The base station will then attempt to complete the call to the user device 105.

Alternatively, if the user initiates a call from user device 105 to another wireless device, the call is routed directly to the wireless switch 140 by the base station serving the cell where the user device 105 resides. Once the call is routed to the wireless switch 140, the same procedure outlined above is used to route the call to the called wireless telephone.

The user device 105 is also in communication, via the communications network 110 with an application server 120. In accordance with one embodiment of the invention, the functionality for configuring the emergency contacts list and to initiate such contact resides in the application server 120. As shown in FIG. 1, the application server 120 includes a contacts application 122, a presence application 124 and a contacts database 126.

In operation, a user can configure a list of contacts. The invention allows the user to handle this configuration in several different ways. For example, the user may configure the contacts list directly from the user device 105. In this case, a user can access the application server 120 via the communications network 110 using the user device 105. The application server 120 will verify whether the user device 105 is authenticated and thus permit access to the application server 120 features. Once the user device 105 is authenticated, the user can input a list of contacts and their respective telephone numbers using a keypad located on the user device 105. A user can also assign priorities or urgency levels to each contact. For example, certain contacts may take priority over others for any call initiated by the user. In addition, certain contacts may be classified by an urgency level and thus are only contacted if the user requests that urgency level. The user can also provide other information to the contacts database 126, such as the location or home address of each contact.

Alternatively, a user can configure the contacts list via the Internet using any device, such as a computer, capable of accessing the World Wide Web. In this case, the user enters a webpage operated by the wireless service provider. The user must first be authenticated. Once authenticated, the user can configure his or her contacts list via the Internet. Once the contacts list has been configured, the user device 105 is now capable of directly reaching the contacts.

In the event that a user wants to contact a predetermined contact, the user depresses a single button on the (wireless) user device 105 which has a designated call button. In this case, the user may be panicked as a result of an emergency situation or may just desire to make a direct call to a predetermined contact. At this point, a command signal (contact request signal) is generated by the user device 105 and sent via the base station 142 to the wireless switch 140. The command signal may include a variety of instructions, including, but not limited to an instruction to retrieve a contact name, an instruction to retrieve a contact telephone number, an instruction to retrieve at least one contact corresponding to an urgency level and an instruction to retrieve a contact location. The command signal is then routed from the wireless switch 140 and received by the application server 120. The command signal is routed to the contacts application 122. The contacts application 122 accesses the contacts database 126 and then retrieves the list of predetermined contacts. The contacts application 122 selects a first contact from the list of contacts based upon a priority given by the user. The contacts application 122 then retrieves presence information from the presence application 124 which provides information about the selected contact's location. Using this information, the contacts application 122 determines whether the first selected contact is available, for example, whether that contact is within the cellular service range, whether the cellular signal is of sufficient strength to complete the call to the contact, whether there is an open communications channel, whether that contact's telephone is on and/or whether that contact's telephone line is busy. If that contact is available, the application server 120 sends an initiate call command to the wireless switch 140 in order to establish a call to the available user. If the selected contact is also a wireless user, the wireless switch 140 will complete the call to the contact via the corresponding cell and base station. Alternatively, if the contact is a landline telephone, the wireless switch 140 will communicate the initiate call command to the public switch 160 via the trunk 165. In this manner, the call is completed through the user's depression of a single button on the user device to the predetermined contact as configured by the user. As described earlier, this call may be an emergency call to an emergency contact as designated by the user or may be a call having a lower urgency.e.

In addition, the application server 120 will route information regarding the selected contact to the user device 105 via the wireless switch 140 so that the user knows that a contact has been selected and that a call is being initiated. Thus, a call is completed to a designated contact through the user depressing only a single key. The invention also allows for the generation of a special ring tone, text message or vibrate signal so that the contact knows that he or she has received a direct call and that the call may be of an emergency nature. These ring tones, text messages and vibrate signals may also vary depending upon the urgency level of the call as selected by the user. In accordance with an embodiment of the invention, rather than completing the call between the user and the available contact, the system will instead leave a voice message from the user to one or more of the available contacts.

Alternatively, rather than presenting the user with only the first available contact having the highest designated priority, the system in accordance with the invention may be configured so that the application server 120 presents to the user, via the wireless switch 140 and the user device 105, a list of all of the contacts who are determined to be available. Thus, in this embodiment, the application server 120 provides the user device 105 with a list of available contacts that the user can scroll through and select for him or herself. The user can make a selection using the interface provided by the user device 105 and this selection is routed to the application server 120 via the wireless switch 140. A call to the selected contact may then be initiated through the user depressing a single button on the user device.

In another embodiment of the invention, the contacts database 126 can be configured to include urgency settings so that particular urgency designations correspond to certain contacts. For example, a high urgency or emergency call may correlate to only family member contacts or public emergency services (e.g., 911, police, fire department, hospital) stored in the database. Likewise, a low urgency designation may correlate a different set of contacts. Thus, when the user initiates a call, he or she may also designate the call with an urgency level, e.g., "emergency," or "medium urgency" or "not urgent." Thus, when a user designates a call with a particular urgency level, the command signal to the contacts application 122 will include an instruction to retrieve only those contacts matching the selected urgency level.

In another embodiment of the invention, when a user designates the call as an "emergency" or "urgent" call, the call is then given priority and will interrupt any existing connection with that contact. Thus, in this embodiment, the initiate call command sent by the contacts application 122 to the wireless switch 140 will include an instruction to interrupt any existing calls and break into the connection to notify the call recipient of the incoming call.

In another embodiment of the invention, the application server 120 may be in communication with a Global Positioning Satellite (GPS) or other location indicator to determine which contact is in closest physical proximity to the user. Thus, the application server 120 receives information about the location of both the user (party initiating the call) and the call recipient in order to determine the distance between the two parties. Once this determination is made, the application server 120 will provide the user with the contact information for the contact who is physically closest to the user and will initiate a call to the user via the communications network 110. In addition, the user device 105 may display information about the location of the selected contact.

In another embodiment, certain of the functionality of the application server 120 may reside at the user device 105. Thus, the contacts database 126 may reside in the memory of the user device 105. The presence application 124 may also reside within the user device 105 so that the determination of available contacts is performed at the user device 105.

Figure 2:
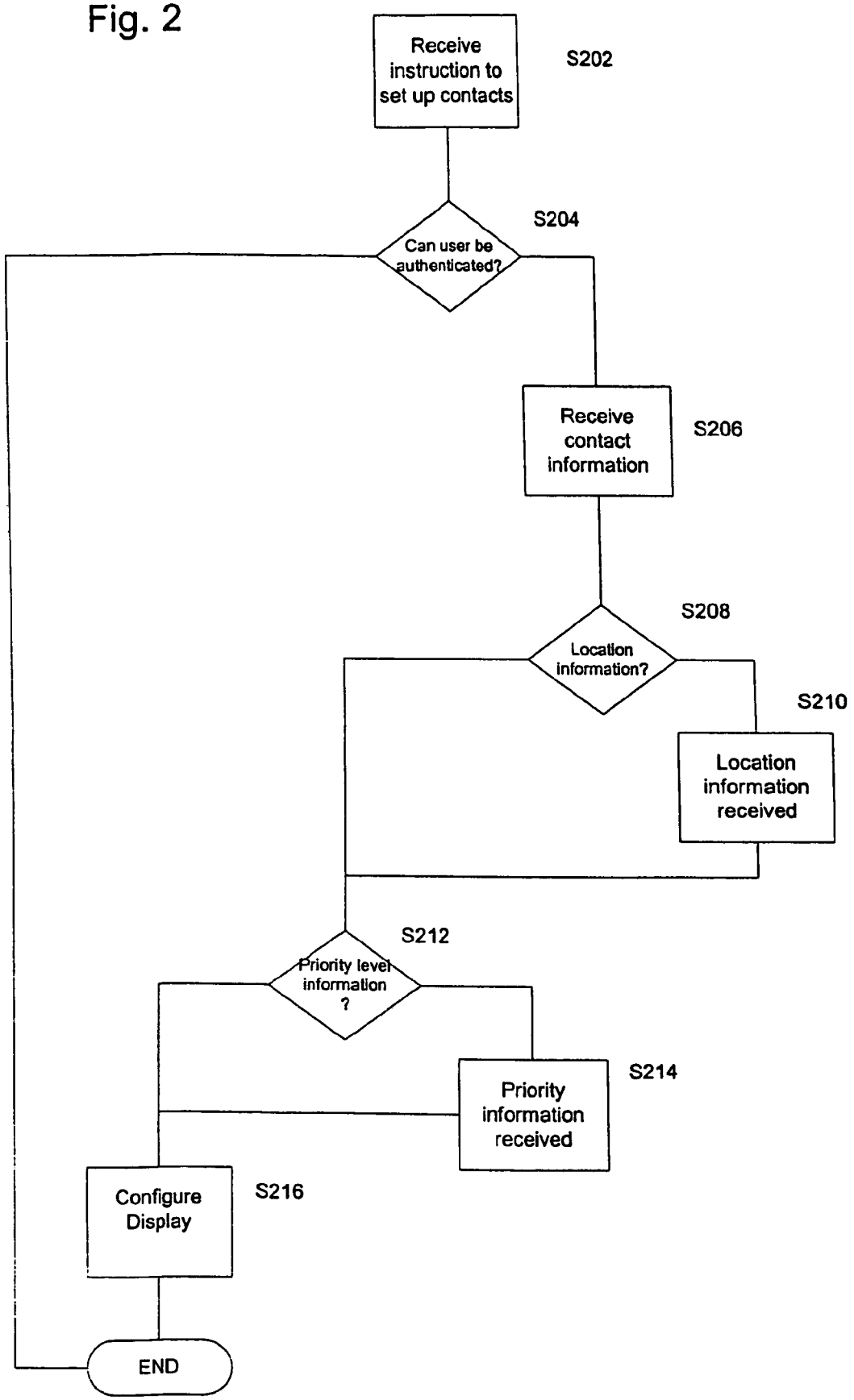
FIG. 2 is a flowchart illustrating a process for establishing a contacts list in accordance with an embodiment of the invention.

FIG. 2 illustrates the process for establishing a contacts list in accordance with an embodiment of the invention. In FIG. 2, the process begins with step S202. In step S202, the system, i.e., the application server 120, receives an instruction to set up a contacts list. This instruction may be received from a user seeking to set up his or her contacts list and may be received from either a user device capable of accessing the system or via a computer capable of accessing the system by, for example, the Internet. Once the instruction to set up the contacts list is received, the process moves to step S204.

In step S204, the system authenticates the user to determine whether he or she should be given access to the system in order to configure a contacts list. The authentication of the user can be accomplished though any number of methodologies, including matching a user's password or identification by the system of the user based on identification of the user device. If the user is authenticated, the process moves to step S206. Otherwise, if the user cannot be authenticated, the process ends.

In step S206, the system receives and stores within memory the contact information input by the now-authenticated user. This contact information may, for example be stored within the contacts database 126 which is continuously updated as new contact information is received by the system. The process then moves to step S208.

In step S208, system queries the user as to whether there is any information available about the location of the input contacts. If the application server receives a signal indicating that there is no location information, the process moves to step S212. Otherwise, if there is location information, the process moves to step S210. In step S210, the system receives the location information associated with the contact and this is stored in memory. The process then moves to step S212.

In step S212, the system queries the user as to whether he or she would like to attach a priority level or category of urgency to each contact. If the system receives a decline signal from the user, the process then moves to step S216. Otherwise, the process moves to step S214 where the system receives priority level information or a category of urgency for some or all of the contacts. This priority level information is stored within the memory. The process then moves to step S216.

In step S216, the system may be configured in accordance with the functionality desired by the user. For example, the system can be configured so that the highest priority contact is first contacted. Alternatively, the system can be configured so that the user is shown a list of contacts that correspond to a level of urgency selected by the user. The user can then select a contact from the displayed list. After step S216, the system is configured and the process ends.

Figure 3:
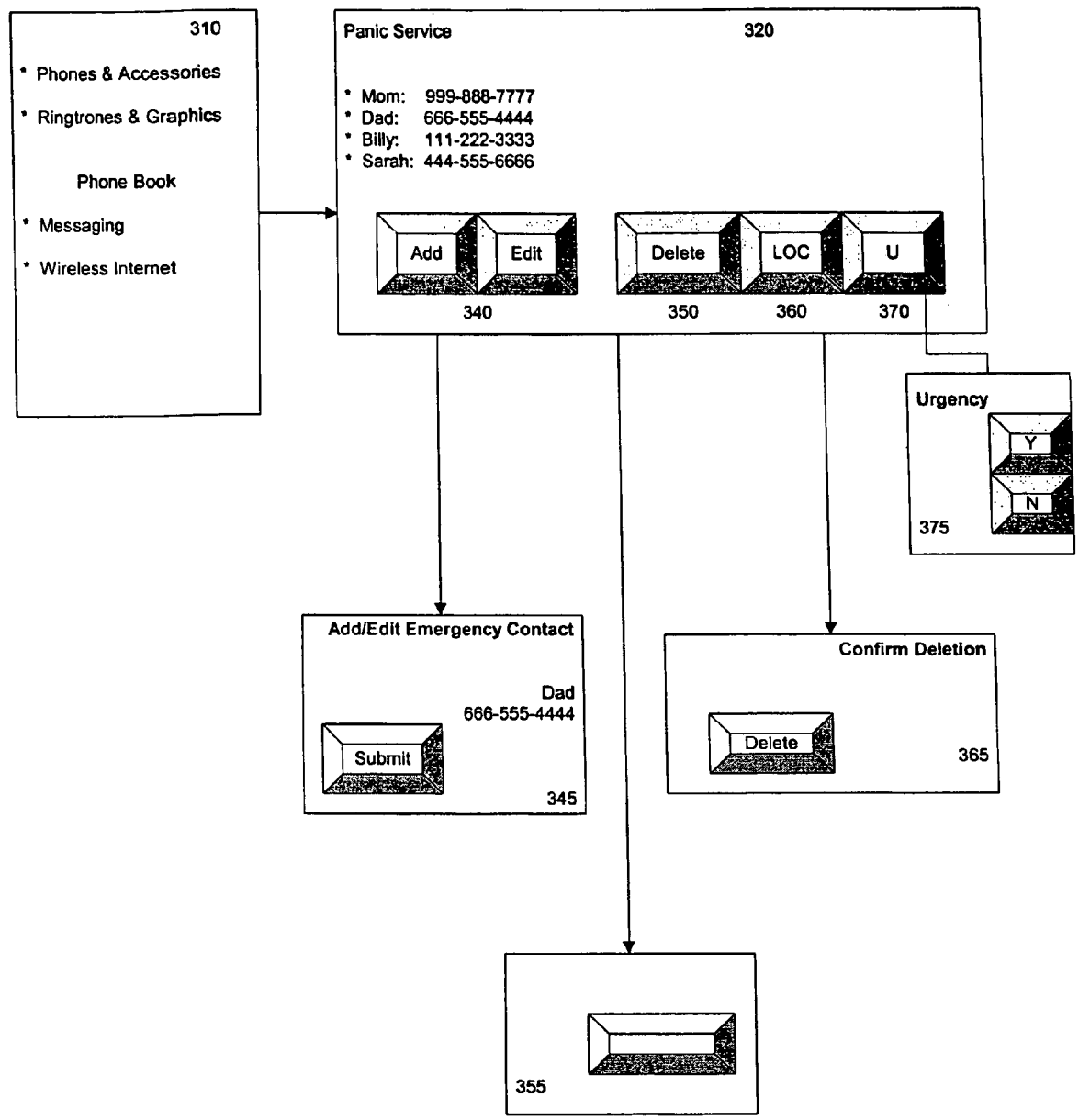
FIG. 3 is an exemplary user interface for establishing contacts in accordance with an embodiment of the invention.

FIG. 3 shows an exemplary user interface for establishing the contacts list as described above. FIG. 3 shows a device configuration window 310 that allows for the configuration of various features associated with the user device, including ring tones, messaging, wireless Internet and the contacts list in accordance with the invention. If a user selects configuration of the contacts list, then window 320 appears. Window 320 allows users to configure various details about their contacts. For example, by depressing the add/edit function 340, add/edit window 345 appears and allows user to enter and edit contact names and telephone numbers. The delete function 350 causes a delete window 355 to appear allowing the user to delete contacts from the contacts list. By depressing the location function 360, location window 365 appears allowing the user to set the address and location of each contact. The urgency function 370 causes an urgency window 375 to appear allowing the user to attach priority and urgency levels to each contact. It is important to note that FIG. 3 is merely exemplary of one type of interface provided by the invention for configuring a contacts list.

Figure 4:
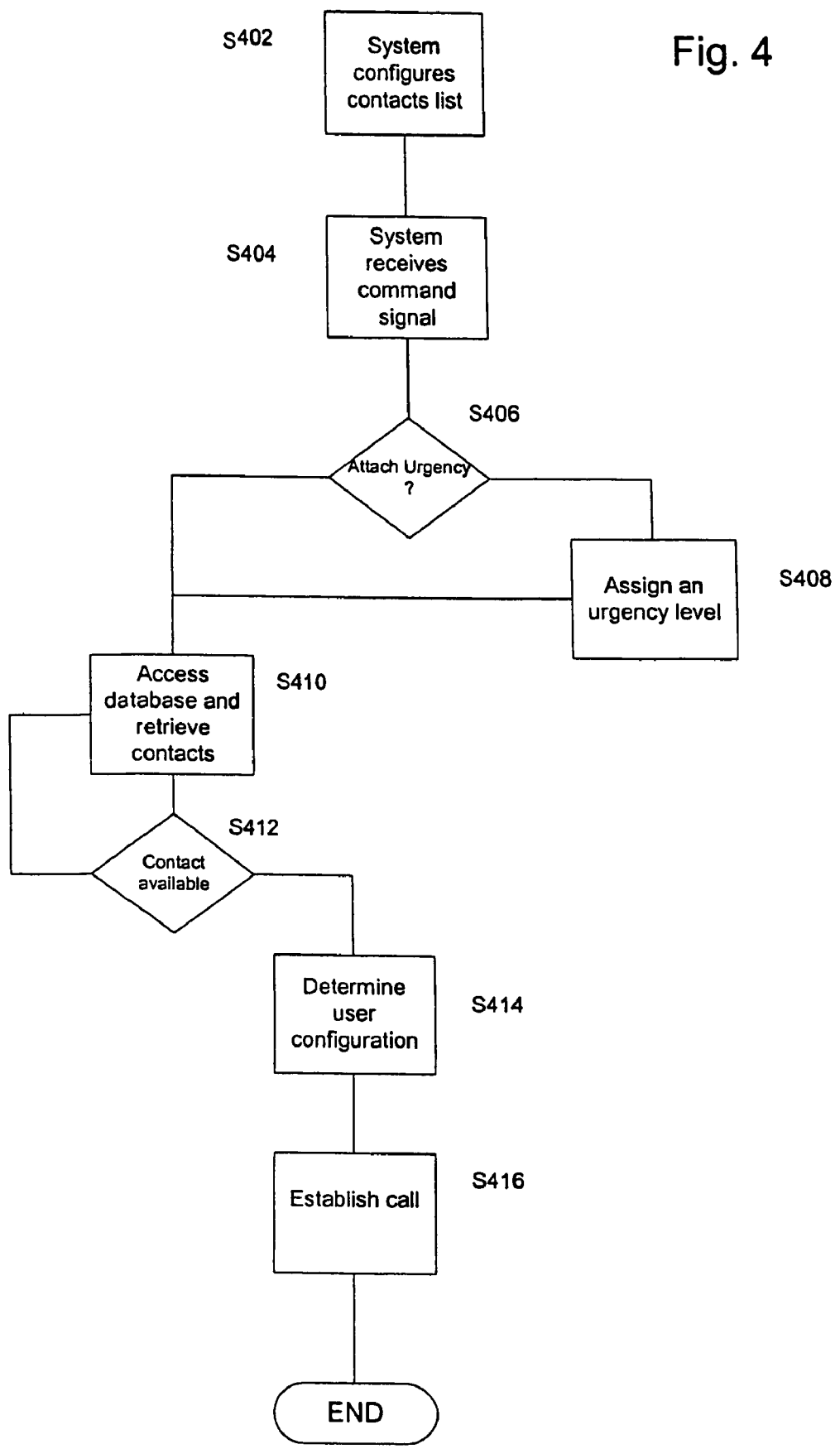
FIG. 4 is a flowchart illustrating a process for establishing direct calls to available predetermined contacts in accordance with an embodiment of the invention.

FIG. 4 illustrates a process for establishing and initiating calls to predetermined contacts in accordance with an embodiment of the invention. The process begins with step S402 where the system is configured with the contacts list established by the user. This may be accomplished through the process shown in FIG. 2. The process then moves to step S404. In step S404, the system receives a command signal (contact request signal) from a user device requesting the initiation of a call to a predetermined contact. The command signal may, for example, be generated by the user depressing a button on the user device for call initiation. The process then moves to step S406.

In S406, the system queries the user as to whether the call has an urgency level (e.g., is the call an emergency call). If the user does not want to attach an urgency level to the call, the process moves to step S410. Otherwise, the process moves to step S408 where the urgency level information set by the user is attached to the command signal. The process then moves to step S410.

In step S410, the system accesses a contacts database based upon and responsive to an instruction of the command signal and retrieves the predetermined contacts list. As described above, the command signal may include an urgency level if the user selected an urgency level. Thus, if the user has attached an urgency level to the call, then in step S410 the system retrieves only those contacts matching the selected urgency level. The process then moves to step S412.

In step S412, the system determines the availability of the selected contacts. This may, for example, include determining whether the retrieved contact(s) are within a cellular service area (e.g., is there a cellular signal available, is the cellular signal of sufficient strength to complete the call, is there an open communications channel), whether the contact(s) is already on the phone, etc. Step S412 may also include determining the location of the retrieved contacts so that the system can contact only those users within a certain distance of the user in the event that the call is an emergency call. If the system determines that a selected contact is unavailable, the process returns to step S410 where another contact is retrieved. The process then moves to step S414 once an available contact is located.

In step S414, the system considers any additional configurations established by the user. For example, if the user wants to first view all of the available retrieved contacts, then those contacts are displayed to the user for selection. The process then moves to step S416.

In step S416, the system, having retrieved at least one available contact, establishes and completes the call to the available contact in accordance with any user defined parameters, such as location restrictions or urgency settings. The user is now in contact with an available contact. At this point, the system may also send an indication to the user that call will be completed (a "complete call signal"). As described above, the user may be placed in voice communication with the available contact, or any other form of communication supportable by the user device, such as text messaging. Also, the contact may receive some indication, such as a special ring tone, to indicate that a priority call has been received. In addition, according to one embodiment of the invention, if the system attempts to complete a call to a contact and receives a busy signal, the system may break through the line or provide some other notification to the contact that a priority call is being received.

Figure 5:
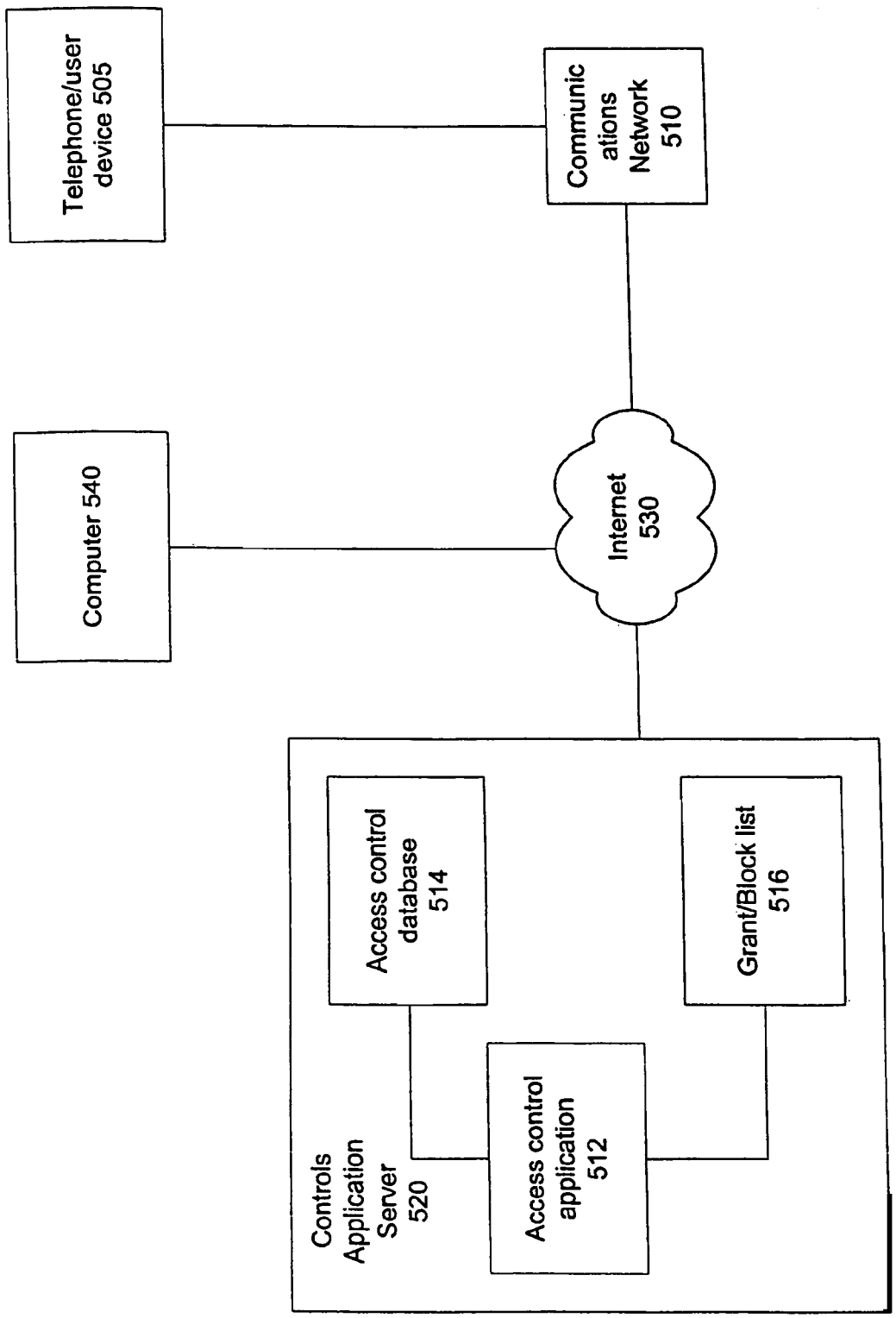
FIG. 5 is a block diagram of a system for establishing access controls in accordance with an embodiment of the invention.

FIG. 5 shows another embodiment of the invention which includes the ability to configure access controls for a communications devices. FIG. 5 shows a user device 505. In accordance with the embodiment of FIG. 5, the user device 505 may be any wireless communications device, such as a cellular phone to be configured with access rules. FIG. 5 also shows a communications network 510. The communications network 510 may be similar to the communications network 110 of FIG. 1, and therefore, include a wireless switch, a public telephone network, cells and bases stations for facilitating wireless and landline communications. FIG. 5 also shows a computer 540 which can also be utilized to set the access controls for the user device 505. Both the computer 540 and the communications network 510 are capable of accessing a controls application server 520 via the Internet 530.

The controls application server 520 allows for configuration of access controls for the user device 505. As shown in FIG. 5, the controls application server 520 includes an access controls application 512, an access controls database 514 and a grant/block list 516.

The controls application server 520 can be accessed by the user device 505 or the computer 540 via the Internet for configuring access controls. The controls application server 520 will first authenticate the party attempting to gain access in order to configure access controls. Once authenticated, the access controls application 512 can be configured with access control rules in accordance with parameters established by the user. The control settings established by the user are then stored in the access controls database 514. The grant/block list 516 is a list identifying those inbound and outbound calls that the system will allow.

The invention allows users to configure a variety of rules. For example, the system may be configured with rules which can: restrict the time when all calls can be received; restrict the time all calls can be made; restrict the time when calls from certain numbers can be received, restrict the time when calls to certain numbers can be sent; restrict the types of calls that can be received or made, as well as, control the ability to make the types of direct calls described in connection with FIG. 1 above.

Thus, in operation, when inbound and outbound calls are received, the communications network contacts the controls application server 520 to determine whether there are any rules governing the incoming or outcoming call. Thus, information about the call, including time and telephone number are provided to the controls application server 520. The access controls application 512 retrieves the access controls set up by the user from the access controls database 514. The access controls application 512 then determines whether the inbound or outbound call meets the access controls set up by the user. In the event that the inbound or outbound call meets the access control rules, an instruction is sent from the controls application server 520 to the communications network 510 instructing the wireless switch to allow the call to pass through to its intended destination. If an access control rule has been violated, then a block call command is sent to the communications network 510 and the wireless switch does not allow the call to pass through. In this case, if the call was generated at the user device 505, the user will be notify that the call has failed.

Figure 6:
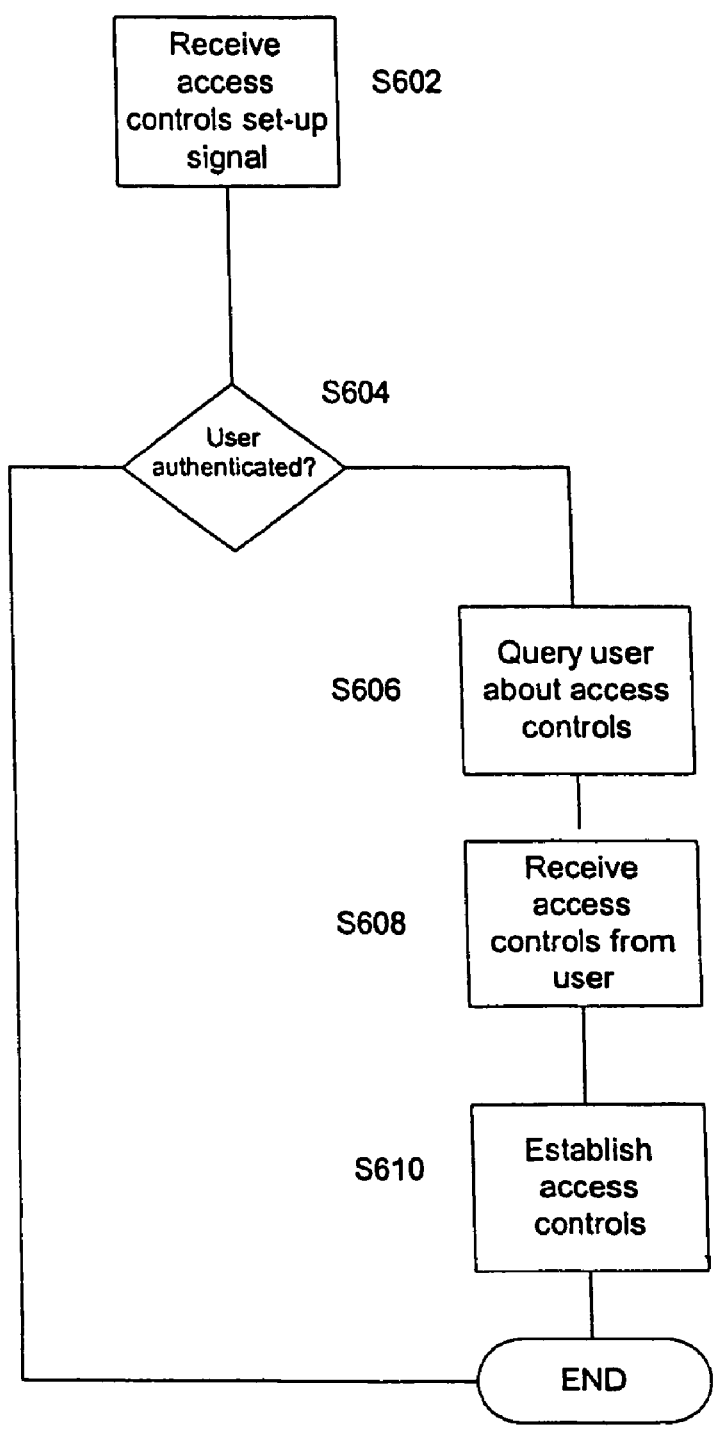
FIG. 6 is a flow chart illustrating a process for establishing access controls in accordance with an embodiment of the invention.

FIG. 6 illustrates a process for establishing access control rules for a user device. The process begins in step S602 where, based upon a user initiating the process for establishing access controls, the system, for example, the controls application server 520, receives an access controls set-up signal. This indicates to the system that a user would like to set up access controls. The user may access the controls application server 520 via the user device to be configured or via a computer capable of accessing the controls application server 520 through the Internet.

In step S604, the system authenticates the user to determine whether he or she should be given access to the system in order to establish and/or alter access controls. If the user is authenticated, the process moves to step S606. Otherwise, if the user cannot be authenticated, the process ends.

In step S606, the system queries the user as to whether new access control rules are to be established or whether existing rules are to be updated. In either case, the system presents the user with an interface so as to facilitate set-up and editing of the access controls. The process then moves to step S608. In step S608, the system receives the access control instructions from the user. These instructions may include new access control rules or changes to existing rules. The process then moves to step S610, where the system establishes the rules governing the user device. As described earlier, these rules may include controls over the time of day when certain calls may be initiated or received, control over to whom a call may be initiated and/or control over from whom calls may be received. Based upon the received instructions, the system will update the access controls rules.

Figure 7:
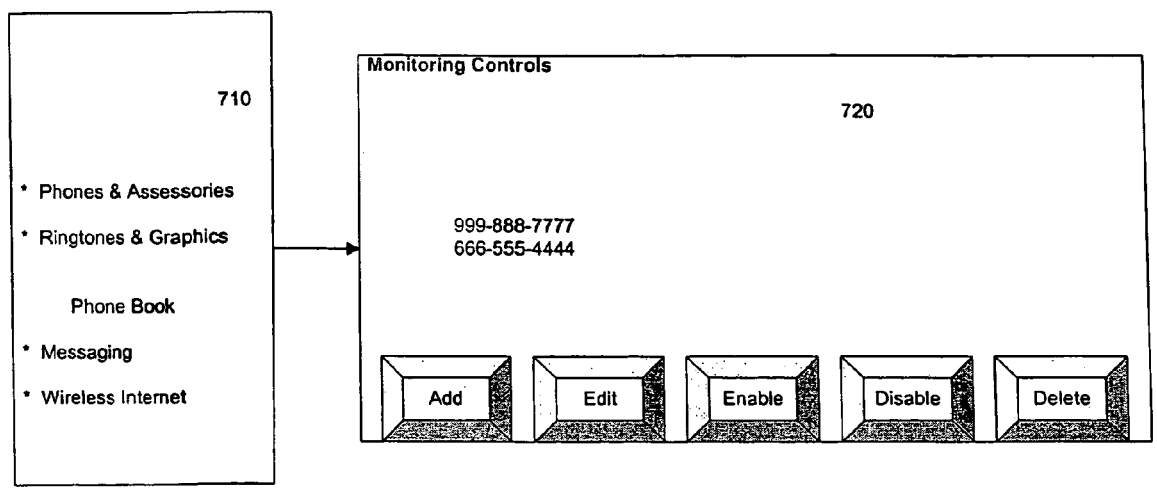
FIG. 7 is an exemplary user interface for establishing access controls in accordance with an embodiment of the invention.

FIG. 7 illustrates exemplary user interface for establishing access controls for a user device via a computer. FIG. 7 shows a device configuration window 710 that allows users to configure various access control rules for a user device. For example, window 720 provides an interface allowing users to add telephone number restrictions, time restrictions, area code restrictions to both incoming and outgoing calls. The window 720 also allows users to enable, disable or temporarily suspend the access control rules for a certain length of time.

Figure 8:
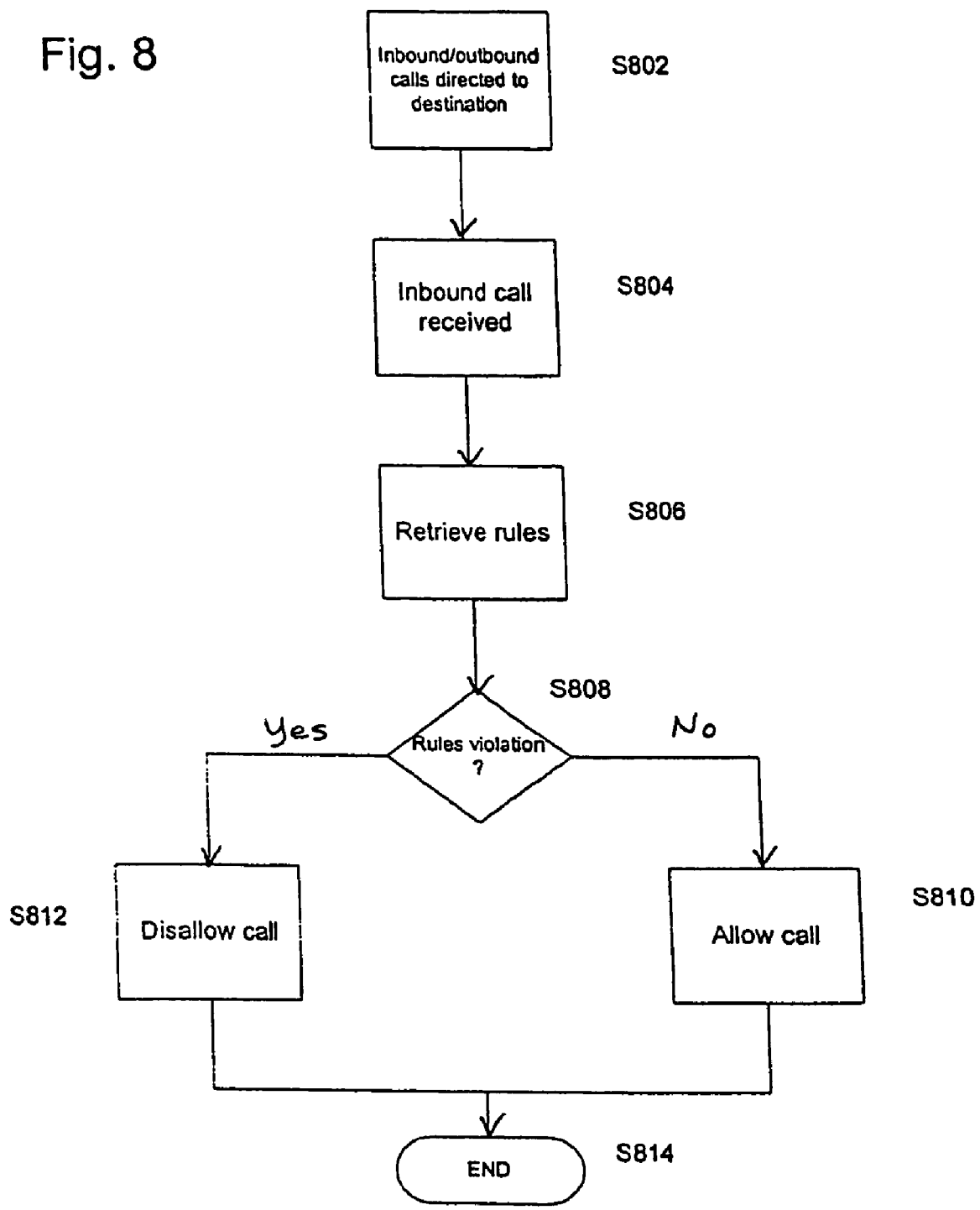
FIG. 8 illustrates a process for the control of incoming and outgoing calls based upon access controls in accordance with an embodiment of the invention.

FIG. 8 illustrates a process by which incoming and outgoing calls are screened to determine whether they meet access control rules set by a user. The process begins with step S802 where an incoming or outgoing call is directed to its destination. The process then moves to step S804. In step S804, the call is received by the communications network (including, for example, public and/or wireless switches) which then accesses an access control application to determine whether there are any access controls limiting the call. Also in step S804, information about the incoming or outbound call, such as time of day and telephone number are stored to be forwarded to the access control application. The process then moves to step S806. In step S806, the call access control application retrieves the access control rules which govern incoming and outgoing calls. The process then moves to step S808. In step S808, the system determines whether the incoming or outgoing call violates one or more of the access control rules. If a violation is identified, the process moves to step S812 where the user is notified of a call failure. The process then moves to step S814 and ends. If there is no violation of the access controls, the process moves to step S810 where the call is allowed to connect. The process then moves to step S814. In step S814 the process ends.

It is important to note that the access controls functionality described above in connection with FIGS. 5-8 can be incorporated into the direct calling of predetermined contacts functionality described in connection with FIGS. 1-4 above. Thus, the access control rules may reside within the application server 120 of FIG. 1 or may be accessible by the application server 120. Thus, when the application server 120 identifies an available contact, the direct call to that contact may not be initiated until a determination is made as to whether the call would violate any of the access controls. For example, a parent may set the access controls so that only emergency calls can be directly connected after a certain time of day.

Figure 9:
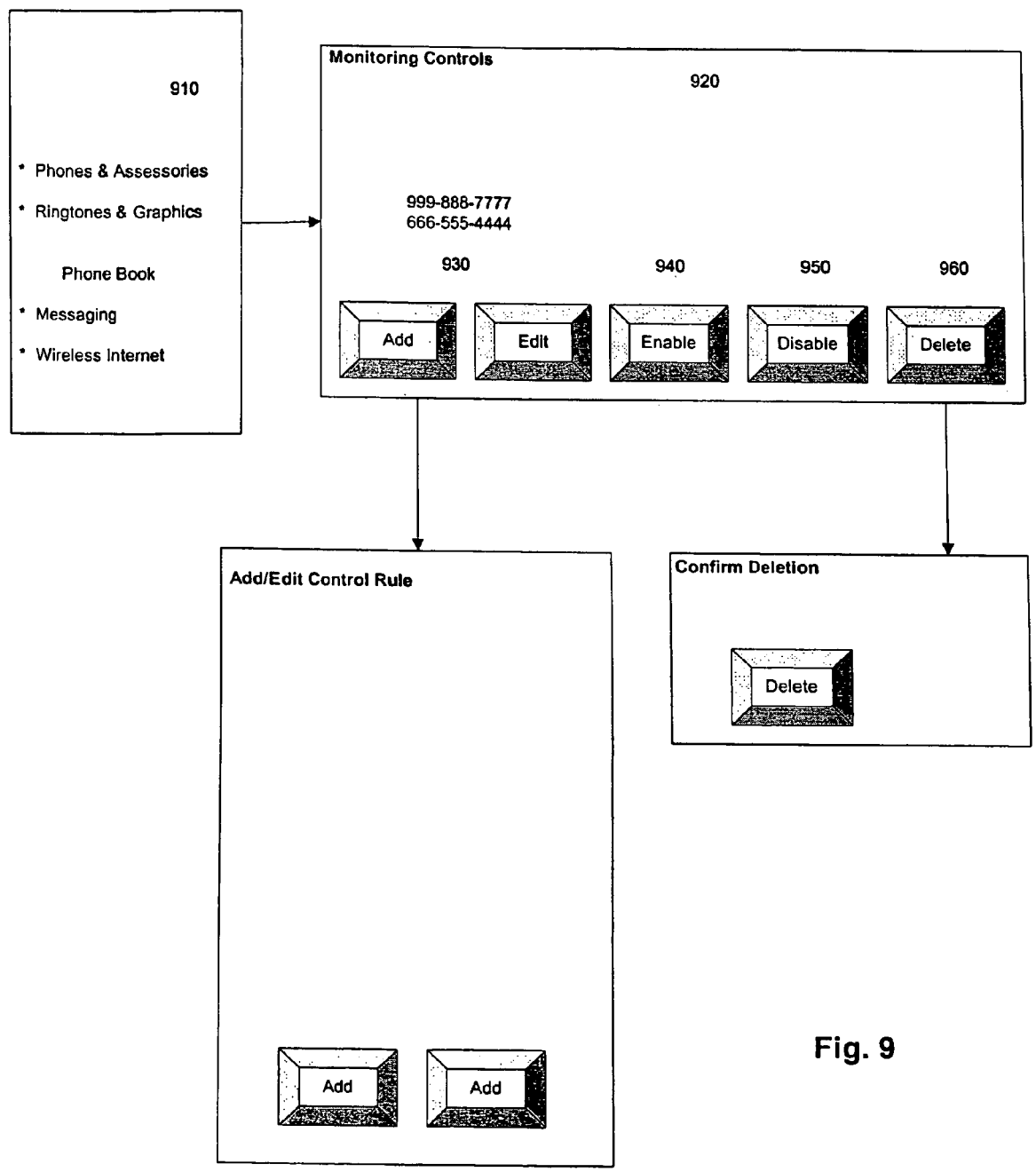
FIG. 9 illustrates an exemplary user interface for establishing both a predetermined contacts list and access controls in accordance with an embodiment of the invention.

FIG. 9 shows an exemplary interface for establishing a direct calling and access controls functionality onto a user device in accordance with an embodiment of the invention. FIG. 9 shows a device configuration window 910 which allows users to configure both a contacts list and various access control rules for a user device. For example, window 920 provides an interface allowing users to add telephone numbers for contacts, their respective locations, as well as various restrictions, such as time, telephone number and area code restrictions to both incoming and outgoing calls. For example, window 920 may include an add/edit function 930 which presents a user with a window allowing the user to add contacts, contact location information and various access controls as described above. The enable function 940 allows the user to confirm and enter his or her selections so that incoming and outbound calls are governed by the parameters established in connection with function 930. The disable function 950 allows users to suspend various rules until further notice. Finally, the delete function 960 allows users to delete certain rules or contact information.

The system described above in FIG. 1 directed to contacting predetermined users through a single key on a user device may also include a novel billing functionality. For example, in FIG. 1, the application server 120 may include a billing application (not shown) that records every instance when a user attempts initiate a one-touch call to a predetermined user. The billing application may then tally the number of one-touch calls over a billing cycle and communicate this tally to the wireless carrier. The user will then be billed based upon the number of one-touch calls initiated. The billing application may also be configured to record the duration and/or urgency level of each one-touch call so that a user may be billed depending upon the duration of all one-touch calls, or depending upon the urgency level of those calls.

Similarly, the access controls functionality illustrated in FIG. 5 may also include a novel billing functionality. For example, the controls application server 520 may include a billing application (not shown) that records certain information, such as the type of access control rules set up by a user, the number of such rules set up by the user and how often those rules are actually used. This information can be communicated from the billing application to the wireless service provider, so that the user may be billed according to the type and/or number of access control rules established and/or the number of instances in which those rules are actually applied to incoming and outgoing calls.

It will be apparent to those skilled in the art that various modifications and variations can be made in the present invention and specific examples provided herein without departing from the spirit or scope of the invention. Thus, it is intended that the present invention covers the modifications and variations of this invention that come within the scope of any claims and their equivalents.

The invention claimed is:

1. A method for automatically establishing a connection in a telecommunications network from an initiating telephone device to at least one predetermined contact, comprising the steps of:
    an application server receiving a contact request signal from said initiating telephone device, wherein the contact request signal includes an urgency level;
    the application server accessing a contacts database based upon at least one instruction of the contact request signal, the contacts database including a plurality of predetermined contacts, wherein each of the plurality of predetermined contacts has an associated urgency level;
    the application server dynamically determining a list of available contacts that match the urgency level from said plurality of predetermined contacts in response to said contact request signal, wherein the determining step identifies a given predetermined contact from said plurality of predetermined contacts as available if:
    the given predetermined contact is on,
    the predetermined contact is within service range,
    the given predetermined contact has a signal of sufficient strength to complete a connection to the given predetermined contact,
    there is an open communications channel, and
    the given predetermined contact is not communicating with another device;
    communicating the determined list of available contacts that match the urgency level to the initiating telephone device;
    permitting the user to select a particular predetermined available contact from said list of available contacts that match the urgency level; and
    the application server establishing an automatic connection between the initiating telephone device and the particular predetermined available contact having been dynamically determined to be available.

2. The method according to claim 1, wherein the contact request signal is received the initiating telephone device.

3. The method according to claim 1, wherein the instruction includes at least one of an instruction to retrieve a contact name, an instruction to retrieve a contact telephone number, and an instruction to retrieve a contact location.

4. The method according to claim 1, wherein the step of establishing an automatic connection further includes determining whether such connection violates predetermined access rules.

5. The method according to claim 1, further comprising the step of establishing a predetermined contacts database.

6. The method according to claim 5, wherein the step of establishing a predetermined contacts database includes providing at least one of a contact name and a contact location information.

7. The method according to claim 1, further comprising the step of tallying each automatic connection in order to generate a bill.

8. A system for establishing an automatic connection in a telecommunications network to at least one predetermined contact, comprising:
    a telephone device adapted to generate a contact request signal, wherein the contact request signal includes an urgency level;
    a contacts application for receiving and processing a request to establish an automatic connection;
    a contacts database accessible by the contacts application, the contacts database storing a plurality of predetermined contacts, wherein each of the plurality of predetermined contacts has an associated urgency level; and
    a presence application for dynamically determining a list of available contacts that match the urgency level from said plurality of predetermined contacts in response to receipt of said contact request signal and during determining the list the presence application identifies a given predetermined contact from said plurality of predetermined contacts as available if:
    the given predetermined contact is on,
    the given predetermined contact is within service range,
    the given predetermined contact has a signal of sufficient strength to complete a call to the given predetermined contact,
    there is an open communications channel, and
    the given predetermined contact is not communicating with another device;
    wherein the contacts application is adapted to communicate the determined list of available contacts that match the urgency level to the initiating telephone device, wherein said telephone device is adapted to display said list to a user and permit the user to select a particular predetermined available contact that matchs the urgency level from said list, and wherein said contacts application initiates a call to the particular predetermined contact once selected.

9. The system according to claim 8, wherein the contacts application initiates a complete call signal based upon a determination that at least one predetermined contact is available.

10. The system according to claim 8, wherein the contacts application initiates a complete call signal based upon a determination that predetermined access control rules are met.

11. A system for establishing an automatic connection in a telecommunications network from an initiating telephone device to at least one predetermined contact, said system comprising:

a memory for storing a plurality of contact telephone numbers, wherein each of the plurality of predetermined contacts has an associated urgency level;

at least one designated priority call key; and a microprocessor connected to the memory and the at least one designated priority key for controlling the storage of the plurality of contact telephone numbers, the microprocessor dynamically determining a list of available contact telephone numbers that match the urgency level from said plurality of contact telephone numbers responsive to a contact request signal from said telephone device that includes an urgency level, a given predetermined telephone contact number being identified as available if:

the given predetermined contact is on, the given predetermined contact is within service range, the given predetermined contact has a signal of sufficient strength to complete a call to the given predetermined contact, there is an open communications channel, and the given predetermined contact is not communicating with another device;

the microprocessor further adapted to communicate the determined list of available contact telephone numbers that match the urgency level to said telephone device to permit a user of said telephone device to select a particular predetermined available contact telephone number from said list, and wherein said microprocessor connects a telephone call from said telephone device to the particular predetermined available contact telephone number once selected.

12. The system according to claim 11, wherein the memory also includes at least one of access rules and a location corresponding to the at least one contact telephone number.

* * * * *

UNITED STATES PATENT AND TRADEMARK OFFICE
CERTIFICATE OF CORRECTION

PATENT NO. : 7,603,108 B2
APPLICATION NO. : 11/019289
DATED : October 13, 2009
INVENTOR(S) : J. Steven Sparks et al.

It is certified that error appears in the above-identified patent and that said Letters Patent is hereby corrected as shown below:

In claim 8, column 13, line 1, "matchs" should read --matches--

Signed and Sealed this

Twenty-fourth Day of November, 2009

David J. Kappos
*Director of the United States Patent and Trademark Office*